United States Patent [19]

Knöll et al.

[11] 4,229,884
[45] Oct. 28, 1980

[54] ARRANGEMENT FOR ELECTROMECHANICAL AXIAL CLEARANCE MEASUREMENT

[75] Inventors: Hartwig Knöll; Klaus Högg, both of Munich; Hermann Laudenberg, Neu-Esting, all of Fed. Rep. of Germany

[73] Assignee: Motoren- und Turbinen-Union Munchen GmbH, Munich, Fed. Rep. of Germany

[21] Appl. No.: 9,858

[22] Filed: Feb. 6, 1979

[30] Foreign Application Priority Data

Feb. 21, 1978 [DE] Fed. Rep. of Germany ....... 2807297

[51] Int. Cl.³ .............................................. G01B 7/14
[52] U.S. Cl. ................................. 33/174 L; 33/172 E; 33/181 R; 33/DIG. 8
[58] Field of Search ............. 33/174 L, 172 E, 181 R, 33/180 R, DIG. 8, 1 PT, 169 F, 174 Q

[56] References Cited

U.S. PATENT DOCUMENTS

| | | | |
|---|---|---|---|
| 3,731,386 | 5/1973 | Kreiensen et al. | 33/1 PT |
| 3,844,047 | 10/1974 | Carson | 33/147 N |
| 3,845,562 | 11/1974 | Dallas | 33/DIG. 8 |
| 3,899,832 | 8/1975 | Hunyar | 33/174 L |
| 3,952,418 | 4/1976 | Akamatsu et al. | 33/174 L |

Primary Examiner—Willis Little
Attorney, Agent, or Firm—Scully, Scott, Murphy & Presser

[57] ABSTRACT

An arrangement for the electromechanical measurement of the axial clearance of rotating elements, particularly for the measurement of the axial clearance of shafts in high-speed turbomachinery, in which the extended shaft of a drive motor extends substantially perpendicular to the rotational axis of a rotating element and is thereby arranged in parallel with the measured object. The shaft is provided with an eccentric feeler at an end located proximate the measured object so that, at a movement of the eccentric feeler towards the measured object, a contact signal is generated by a contact resistance responsive to falling below of a resistance threshold value between the electrically insulated eccentric feeler and the measured object as measured by an indicator. Concurrently, the instantaneous indicated value of an absolute angle-measuring encoder is stored, and the drive motor controlled so as to reverse the direction of rotation of the shaft into its zero position.

6 Claims, 4 Drawing Figures

ARRANGEMENT FOR ELECTROMECHANICAL AXIAL CLEARANCE MEASUREMENT

BACKGROUND OF THE INVENTION

1. Field of the Invention

The present invention relates to an arrangement for the electromechanical measurement of the axial clearance of rotating components and, more particularly, the measurement of the axial clearance of shafts in high-speed turbomachinery, including a housing which can be fixed relative to a measured object. A motor-driven rotatable member is supported within the housing, with which a sensor is movable towards the measured object and, after the triggering of a contact impulse, is moved away from the measured object. The sensor is electrically insulated from the housing and from the measured object.

2. Discussion of the Prior Art

An arrangement has become known from the periodical "Records for Technical Measurement", issue of January 1974, pages 11 and 12, which is adapted for the measurement of distances, in effect more precisely, for the measurement of the radial gap between compressor or turbine blade tips and the inner wall of the housing adjacent the blade ends.

For this purpose, in the known arrangement the result of the measurement is adapted to be determined by the displacement of an axially movable sensor pin through the intermediary of a differential transformer linear transducer, which is arranged at both sides of a pin-like extension of the sensor opposite the location of measurement. The utilization of this apparatus for axial clearance measurement by means of an eccentric feeler is not possible, inasmuch as the sensor pin only moves in an axial sliding movement.

Moreover, temperature-occasioned uncontrolled thermal expansions of the pin-like extension lead to errors in measurement in the above case, and namely in particular, when this extension must be constructed relatively lengthy for reasons of installation.

Consequently, the above-mentioned known arrangement is very largely unsuitable for axial clearance measurement, especially when the constructional demands of the machine involved, for instance, a gas turbine jet engine, facilitate only a lateral accessibility to the measured object, meaning in a radial direction to the rotor, whose axial clearance is to be measured.

Contemplated in particular hereby is the rotor of the gas generator of a gas turbine jet engine constructed with a plurality of shafts wherein, for example, the high-pressure turbine of the gas generator has connected thereto at least one further turbine for the drive of a low-pressure or intermediate-pressure compressor arranged ahead of the high-pressure compressor.

SUMMARY OF THE INVENTION

Accordingly, it is a primary object of the present invention to obviate the drawbacks encountered in the state of the art and to provide an arrangement of the type described through which it is possible to attain optimum axial clearance measurements.

The foregoing object is achieved at a relatively simple construction and relatively easy manipulation of the arrangement with due consideration being given to difficult conditions of installation which predominantly necessitate a lateral access into the measuring apparatus directed towards the longitudinal axis or axis rotation of the measured object, as well as, depending upon circumstances, a relatively lengthy constructed measuring apparatus.

In order to attain the set objects, the present invention contemplates for the provision of the following principal features:

The sensor is a rotatable member which is operatively coupled with the shaft extension of the drive motor. In its operative condition, the entire shaft arrangement extends essentially perpendicular to the axis of rotation of a rotating component and thus parallel to the measured object and, furthermore, is equipped with an eccentric feeler at the end lying proximate to the measured object.

An absolute angle-measuring encoder is provided so as to facilitate definition of the zero position of the shaft, as well as determine a change in the distance between the eccentric feeler and the measured object from a concurrently effected change in the angle of rotation of the shaft.

The dropping of a resistance below a threshold value of a contact resistance measured between the electrically-insulated eccentric feeler and the measured object during the movement of the eccentric feeler towards the measured object generates a contact signal whereby there is concurrently stored the instantaneous indicated value of the absolute angle-measuring encoder, and the direction of rotation of the drive motor, and thereby also that of the shaft, is reversed and hereby returned into the zero position.

BRIEF DESCRIPTION OF THE DRAWINGS

Reference may now be had to a detailed description of a preferred embodiment of the invention taken in conjunction with the accompanying drawing.

DETAILED DESCRIPTION

Figure 1:
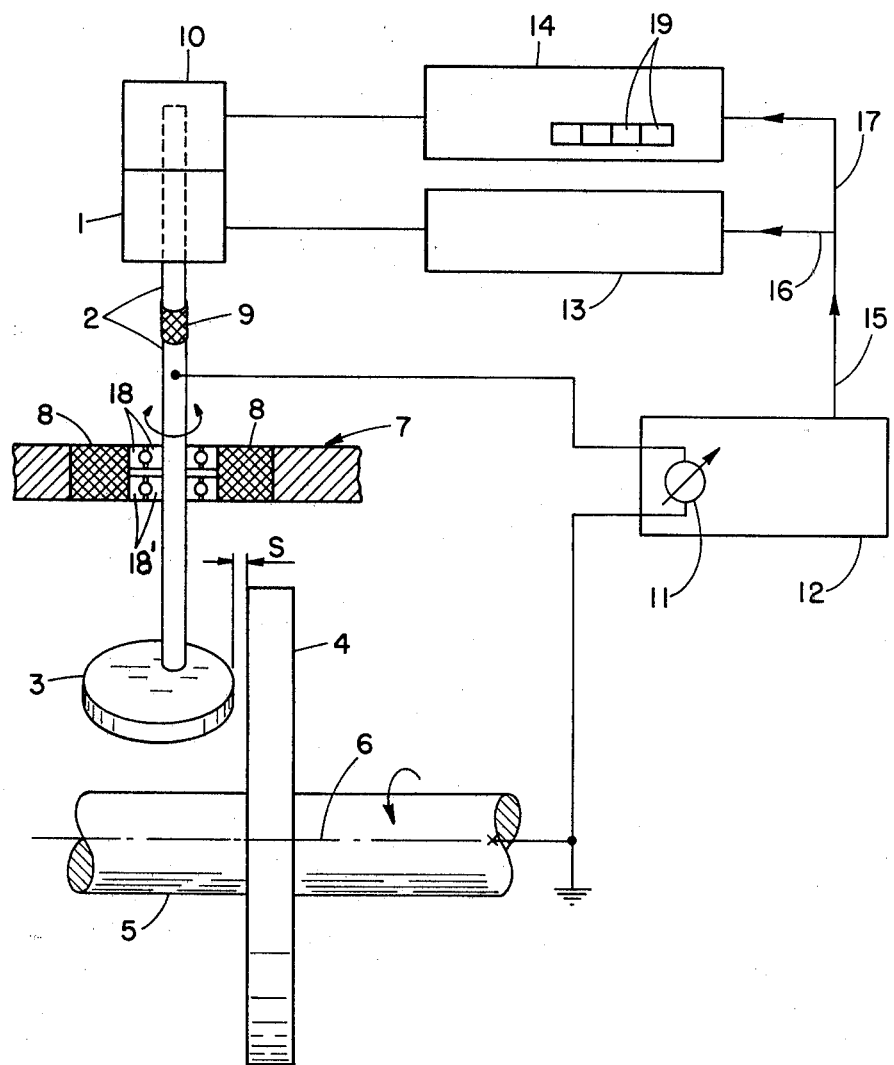
FIG. 1 illustrates the inventive measuring arrangement in a schematic manner.

An electric motor is identified by reference numeral 1, and a shaft driven by the motor and extending downwardly therefrom by reference numeral 2. Depending upon the direction of rotation, an eccentric feeler which is connected with the shaft 2, in this instance, an eccentrically arranged cam or disc 3 mounted on the shaft end, is movable towards or away from the measured object 4. The measured object 4 relates to a disc which is seated on a machine shaft 5, and whose axial clearance is to be measured. The rotational or longitudinal axis of the machine shaft 5 is identified by reference numeral 6.

The shaft 2 of the measuring apparatus is rotatable within a housing 7, in which the electrical insulations of the shaft 2 with respect to the housing 7 as well as the electric motor 1 are designated by reference numerals 8 and 9.

Located above the electric motor 1 is an absolute angle-measuring encoder 10 through the intermediary of which there can be electrooptically measured the angle of rotation of the shaft 2 during rotation thereof, and with which it is also possible to define the zero or starting position of the shaft 2 inclusive of the disc 3. A predetermined angle of rotation of the shaft 2 presently is hereby specific axial distance S between the outer circumferential surface of the disc 3 and the corresponding mating surface of the measured object 4.

Identified further, as shown in sequence in the drawing, are an indicator 11 for the electrical contact resistance, an electronic detector unit 12, a motor control unit 13, and a measured value storage unit 14.

The measuring sequence is as follows:

The electric motor 1 rotates the eccentric feeler or disc 3 through the intermediary of the shaft 2 from the zero position towards the measured object 4 for so long until the electrical contact resistance between the shaft 2 inclusive of the disc 3 and the measured object 4 as measured by the indicator 11 drops below a set threshold value of, for example, 10 kΩ. At this point in time, the electronic detector unit 12 emits a signal impulse and, as a consequence, the command "contact" (signal flow path 15, 16, 17), whereby the instantaneous indicated value of the angle-measurement encoder 10 is electonically stored and the direction of rotation of the electric motor 1 is automatically reversed by the motor control unit 13 so as to reconvey the shaft 2 together with disc 3 into the zero position.

The measured value (digital encoded angle of rotation) is stored and indicated in the measured value storage unit 14, and namely even when the disc 3 has already again left the "contact position". An indicator field for reading off the measured value is designated by reference numeral 19.

The initiating factor for the measurement is thus the apparent electrical contact between the disc 3 and the measured object 4. The relatively high threshold value of the contact resistance of, for example, 10 kΩ, signifies, at a measuring voltage of 15 V, that the contact will, however, be only very light, based on the assumption that the measured object 4 is stationary. In the principal field of application, in effect, the measurement of the axial clearance of the machine shaft 5, it is assumed that the measured object 4 is conveyed past the disc 3 at circumferential speeds which occur in actual practice. In that case, only an apparent galvanic contact is evident between the shaft 2 and the measured object 4. The assumed threshold value of 10 kΩ for the contact resistance can already be achieved at an approach of the disc 3 to the measured object 4 to about 0.2 to 0.4 μm.

As can be ascertained from the drawing, in the present arrangement the angle of rotation of the shaft 2 is measured electrooptically.

Figure 2:
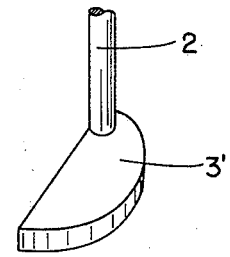
FIG. 2 illustrates an eccentric disc having a semicircular configuration which is suitable for use in the arrangement of FIG. 1.
Figure 3:
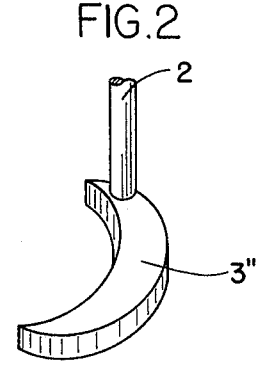
FIG. 3 is a similar eccentric disc having a crescent shape.
Figure 4:
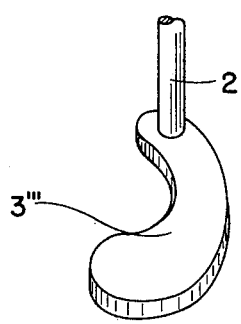
FIG. 4 illustrates yet another eccentric disc having a reniform configuration.

As illustrated respectively by FIGS. 2, 3 and 4, the eccentric feeler can also be shaped into semicircular, crescent-shaped or reniform configurations. In any case, care must be exercised that the outer circumferential surface of the disc-shaped eccentric feeler always extends in parallel to the measured object.

Pursuant to the drawing, the shaft 2 is rotatable only in a circumferential direction, and namely through the ball bearings 18 and 18' which are fastened to the housing 7 through the intermediary of their outer races.

As a consequence, the measurement results can advantageously be determined exclusively through the current shaft rotation.

It is also not illustrated in the drawing that the shaft which is connected with the drive motor can be built into a housing which, upon occasion, may be constituted of several cylindrical housing sections, and which can be equipped with devices for mounting of the measuring apparatus, for instance, on the outer housing of a turbomachine, or turbine engine, or on the compressor or turbine housing of a gas turbine engine.

In the interest of obtaining optimum measurement results, and with further consideration being given to predetermined installation conditions, it may be advantageous that the shaft together with the eccentric feeler be adjustable relative to the drive motor as well as the angle-measuring encoder by means of a cardanic linkage element, or a hose-like torsion-resistant connecting member.

If required, the arrangement may be so constructed that it is possible to have a variable axial displacement of the housing of the measuring apparatus inclusive of the shaft together with feeler relative to the measured object.

What is claimed is:

1. In an arrangement for the electromechanical measurement of the axial clearance of rotating elements, particularly for the measurement of the axial clearance of shafts in high-speed turbomachinery, including a housing fixed in position relative to a measured object; a rotatable member supported in said housing; a motor driving said rotatable member; sensor means connected to said rotatable member and being movable towards said measured object and, responsive to the triggering of a contact impulse, being movable away from said measured object, said sensor means being electrically insulated from said housing and from said measured object, the improvement comprising:
   (a) said rotatable member being the extended shaft of said drive motor extending substantially perpendicular to the axis of rotation of a rotating element in the operating condition of the former and parallel to the measured object; said sensor means including an eccentric feeler fastened to the end of said shaft proximate the measured object;
   (b) an absolute angle-measuring encoder for defining the zero position of said shaft and determining a change in distance between said eccentric feeler and said measured object from a concurrently occurring change in the angle of rotation of said shaft; and
   (c) indicator means for measuring a contact resistance so as to generate a contact signal responsive to falling below a resistance threshold value between the electrically-insulated eccentric feeler and said measured object during movement of said eccentric feeler in a direction towards said measured object whereby there is stored the instantaneous indicated value of said absolute angle-measuring encoder and said drive motor concurrently controlled so as to reverse the direction of rotation of said shaft into the zero position thereof.

2. Arrangement as claimed in claim 1, said eccentric feeler comprising a disc eccentrically mounted on said shaft.

3. Arrangement as claimed in claim 2, wherein said disc has a semicircular configuration.

4. Arrangement as claimed in claim 2, wherein said disc has a crescent-shaped configuration.

5. Arrangement as claimed in claim 2, wherein said disc has a reniform configuration.

6. Arrangement as claimed in claim 1, wherein said eccentric feeler has a circumferential surface extending in parallel with the measured object.

* * * * *